United States Patent
Withun

[19]

[11] Patent Number: 5,829,726
[45] Date of Patent: Nov. 3, 1998

[54] APPARATUS FOR SUPPORTING A CONTAINER

[75] Inventor: Matthew C. Withun, Rochester Hills, Mich.

[73] Assignee: LDM Technologies, Inc., Auburn Hills, Mich.

[21] Appl. No.: 868,237

[22] Filed: Jun. 3, 1997

[51] Int. Cl.⁶ .................................................... A47K 1/08
[52] U.S. Cl. ................................. 248/311.2; 248/309.1; 224/926
[58] Field of Search ............................ 248/311.2, 309.1, 248/313, 316.1, 276.1, 286.1, 292.13, 188.5; 224/926; D7/619; D12/419; 297/188.15, 188.16, 188.17

[56] References Cited

U.S. PATENT DOCUMENTS

| | | | |
|---|---|---|---|
| 945,762 | 1/1910 | Dieleman | 248/292.13 |
| 3,497,076 | 2/1970 | O'Brien | 297/188.17 |
| 4,511,072 | 4/1985 | Owens | 224/273 |
| 4,738,423 | 4/1988 | DiFilippo et al. | 248/311.2 |
| 4,756,572 | 7/1988 | Dykstra et al. | 297/188.17 |
| 4,792,184 | 12/1988 | Lindberg et al. | 297/194 |
| 4,907,775 | 3/1990 | Lorence et al. | 248/311.2 |
| 5,018,633 | 5/1991 | Toth et al. | 248/311.2 |
| 5,060,899 | 10/1991 | Lorence et al. | 248/311.2 |
| 5,141,194 | 8/1992 | Burgess et al. | 248/311.2 |
| 5,259,579 | 11/1993 | Schneider . | |
| 5,297,767 | 3/1994 | Miller et al. | 248/311.2 |
| 5,603,477 | 2/1997 | Deutsch | 248/311.2 |
| 5,692,718 | 12/1997 | Bieck | 248/311.2 |

Primary Examiner—Leslie A. Braun
Assistant Examiner—Robert Lipcsik
Attorney, Agent, or Firm—Harness, Dickey & Pierce, P.L.C.

[57] ABSTRACT

An apparatus for supporting a container includes a two-stage frame and a biasing mechanism. The two-stage frame includes a carrier member and a cup tray member telescopically received by the carrier member. The frame is moveable between a stowed position substantially within a console of a vehicle interior and a deployed position extending from the console of the vehicle interior. Between the stowed position and the deployed position, the cuptray member pivots about an axis from a first plane to a second plane, the cuptray member telescopically retracts relative to the carrier member, and the carrier member translates within the first plane. The biasing mechanism interconnects the carrier member and the cuptray member and functions to bias the cuptray member to the first plane when the frame is deployed. The biasing mechanism further functions to bias the cuptray member to telescopically retract relative to the carrier member as the frame is moved towards its stowed position.

10 Claims, 2 Drawing Sheets

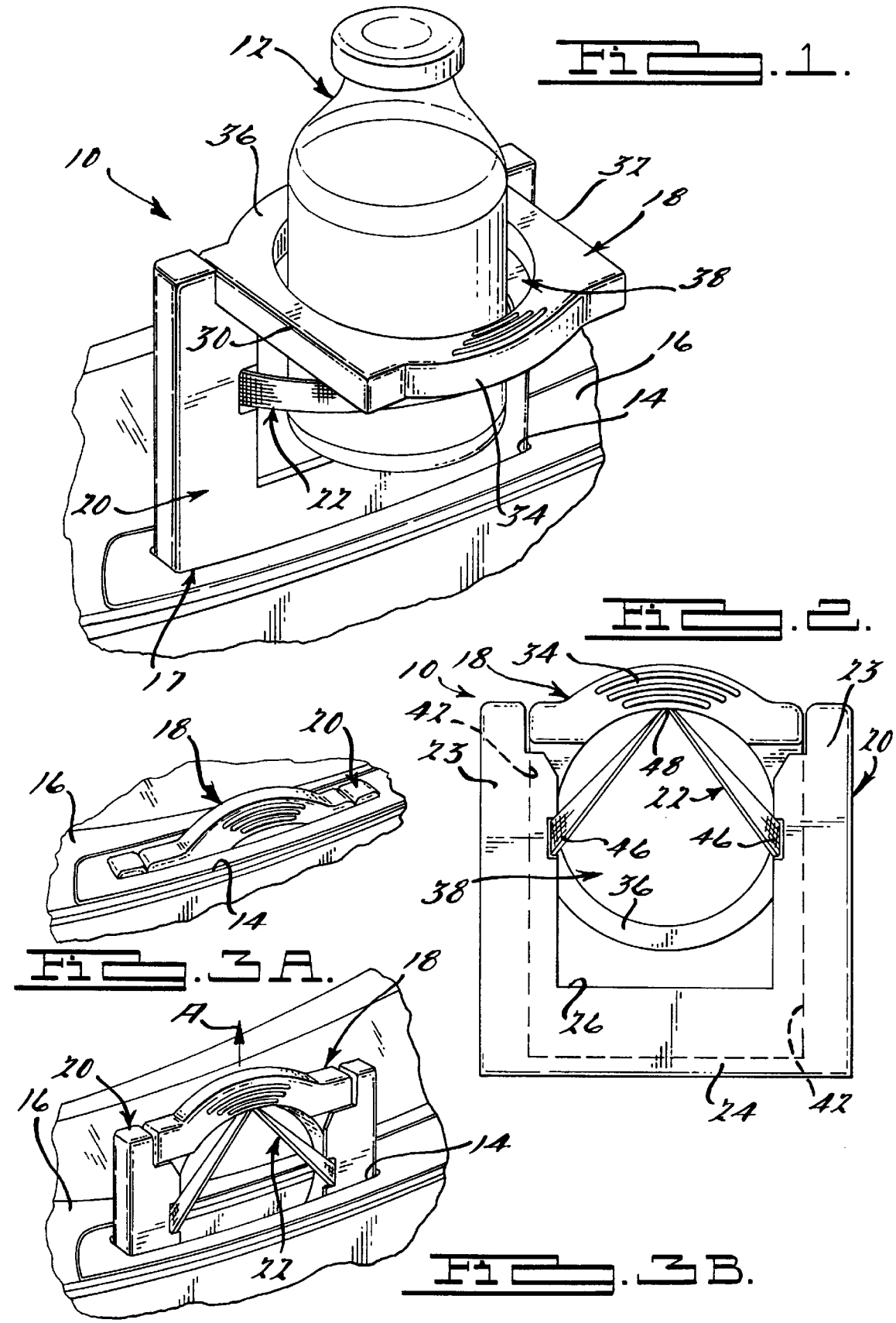

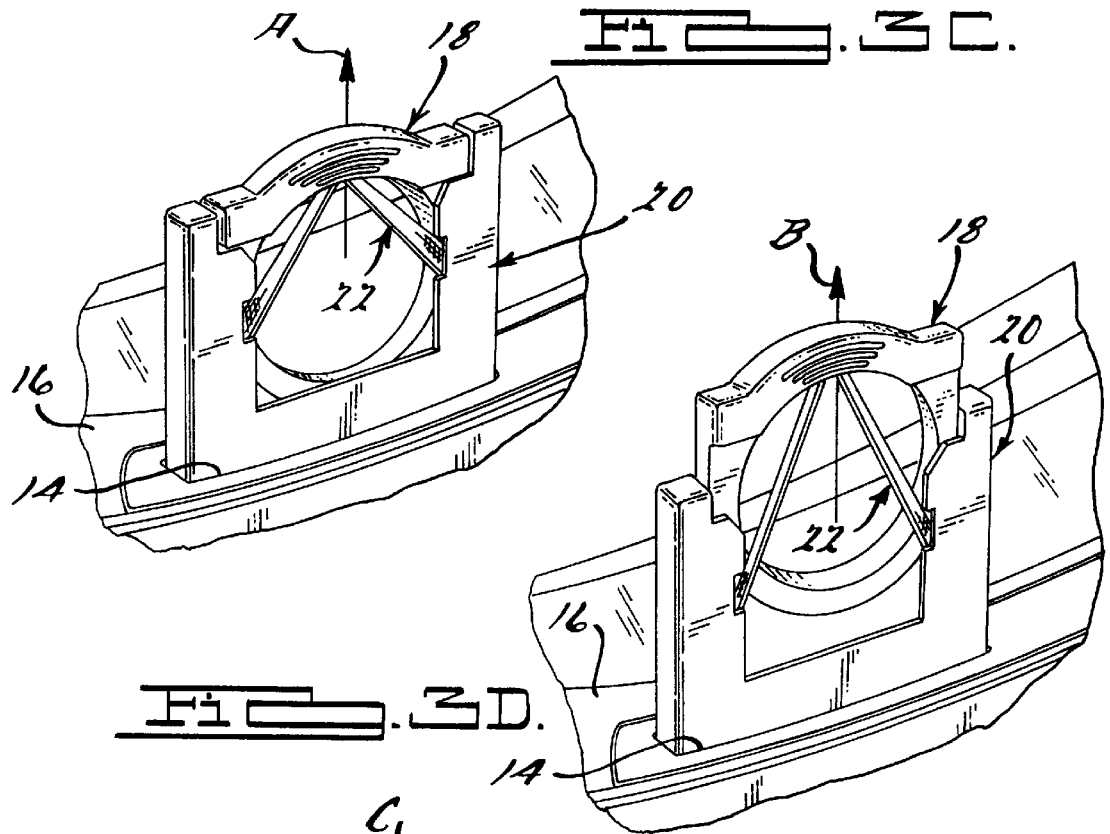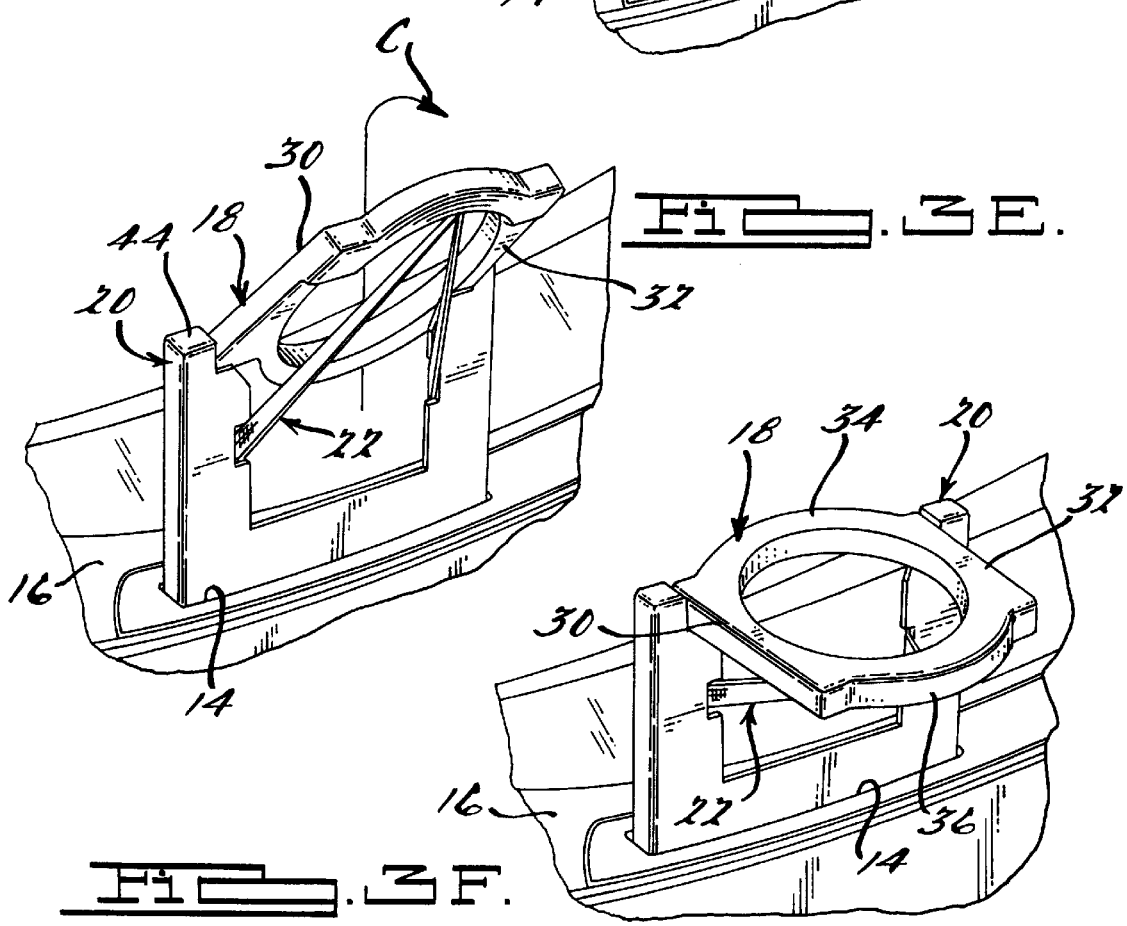

APPARATUS FOR SUPPORTING A CONTAINER

BACKGROUND

1. Field of the Invention

The present invention generally relates to an apparatus for supporting a container. More particularly, but not exclusively, the present invention relates to a container supporting apparatus for a vehicle which includes a biasing mechanism which interconnects two relatively movable components of the apparatus for assisting in deployment of the apparatus and reducing relative movement between the components in the deployed position.

2. Discussion

Beverage containers, including but not limited to coffee mugs, bottles, cans and paper cups, are available in a wide range of sizes and are often transported within the interior of vehicles for the convenience of the occupants. By the nature of their generally upright and cylindrical constructions, beverage containers are not sufficiently stable to functionally withstand the jostling encountered during normal motor vehicle travel unless physically held or otherwise appropriately secured. Because it is often desirable to set aside a beverage container during the course of a vehicular trip, the containers are often precariously placed on the floor or other surface where they are likely to be upset.

A number of devices for stabilizing containers within vehicles have been heretofore developed. Such devices range from simple static constructions intended to receive a single beverage container of average size to complex structures deployable from consoles, dashboards, and armrests which adjustably receive multiple beverage containers. One example of such a device is shown and described in U.S. Pat. No. 4,792,184 to Lindberg, et al. In FIGS. 5–7, Lindberg et al. discloses a container holder having rigid segments pivotally attached to a frame and mounted adjacent an aperture for receiving a container. The rigid segments are intended to be displaced upon insertion of the container within the aperture and are mutually biased into engagement with the container by an elastic band. The elastic band is located within the aperture immediately below the rigid segments and must be radially displaced upon entry of the container.

The design objectives for cupholder devices are many and are often conflicting. Such objectives include considerations such as interior styling, structural integrity and cost.

Of the numerous cupholder devices previously developed, many have proven to be commercially successful for their intended applications. In vehicle interior design, it is often aesthetically desirable to incorporate a cupholder which can be hidden from sight when not in use. Such a cupholder is dynamic in the sense that it is moveable between a deployed position and a stored position. A disadvantage common between existing cupholder devices relates to a difficulty in conveniently and efficiently stowing the device when it is not in use. The available areas of the vehicle interior for cupholder storage are often extremely limited in size. Known cupholders suitable for restricted areas typically are of a simple, compact construction. As a result, the interconnection between moveable parts is often not sufficiently rigid, thereby causing undesirable movement between the elements during use. Additionally, such constructions frequently impart a perception of inferior quality to the user.

SUMMARY OF THE INVENTION

In view of the foregoing above, it is a principal object of the present invention to provide an improved container supporting apparatus which overcomes the disadvantages of known constructions.

It is another object of the present invention to provide an apparatus for supporting a beverage container which is capable of releasably and securely receiving containers of varying dimensions.

It is a more specific object of the present invention to provide an apparatus for supporting a beverage container which includes a biasing mechanism operative for assisting in movement of the frame from a deployed position to a stowed position and further operative to reduce relative movement between the components.

It is a related object of the present invention to provide an apparatus for supporting a beverage container moveable between a stowed position and a deployed position which provides an improved perception of quality to the user during deployment.

In a first form, the present invention provides an apparatus for supporting a container deployable from a structure of a vehicle interior. The apparatus includes a two-stage frame moveable between a stowed position and a deployed position. The two-stage frame has a first component and a second component. The first component is translatable between a first position substantially within the structure of the vehicle interior and a second position extending from the structure of the vehicle interior. The second component is telescopically received by the first component such that the second component is moveable relative to said first component between a telescopically extended position and a telescopically retracted position. The apparatus further includes a biasing mechanism interconnecting the first component and the second component. The biasing mechanism is operative to bias the second component to its telescopically retracted position when the frame is moved from its deployed position towards its stowed position.

In another form, the present invention is directed to an apparatus for supporting a container deployable from a structure of a vehicle interior. The apparatus includes a two-stage frame moveable between a stowed position and a deployed position. The two-stage frame includes a carrier member and a cuptray member. The carrier member is translatable in a first plane between a first position substantially within the structure of the vehicle interior and a second position extending from the structure of the vehicle interior. The cuptray member is interconnected to the carrier member for pivotal movement about an axis between the first plane and a second plane. The apparatus further includes a biasing mechanism interconnected to the carrier member and the cuptray member. The biasing mechanism is operative for biasing the cuptray member to the second plane.

In a more preferred form, the present invention is directed to an apparatus for supporting a container which is deployable from a console of a vehicle interior. The apparatus includes a two-stage frame having a carrier member and a cuptray member. The cuptray member is telescopically received by the carrier member. The two-stage frame is moveable between a stowed position substantially within the console of the vehicle interior and a deployed position extending from the console of the vehicle interior. During movement of the frame between the stowed position and the deployed position, the cuptray member pivots about an axis from a first plane to a second plane, the cuptray member telescopically retracts relative to the carrier member, and the carrier member translates within the first plane. The apparatus for supporting a container further includes a biasing mechanism interconnecting the carrier member and the cuptray member. The biasing mechanism biases the cuptray member to the first plane when the two-stage frame is deployed. The biasing member further biases the cuptray member to telescopically retract relative to the carrier member as the frame is moved toward the stowed position.

From the subsequent detailed description taken in conjunction with the drawings, other objects and advantages of the present invention will become apparent to those skilled in the art.

BRIEF DESCRIPTION OF THE DRAWINGS

FIG. 1 is a perspective view of an apparatus for supporting a beverage container constructed in accordance with the teachings of the preferred embodiment of present invention shown in operative association with an exemplary beverage container and operatively interconnected with a portion of a vehicle interior.

FIG. 2 is an enlarged side view of the cuptray member and carrier member of the apparatus for supporting a beverage container of FIG. 1 removed from the vehicle interior for purposes of illustration and showing the members in a stored position.

FIGS. 3A–3F represent a series of perspective views illustrating the apparatus for supporting a beverage container of FIG. 1 as it is moved between a stored position (FIG. 3A) and an operative position (FIG. 3F).

DETAILED DESCRIPTION OF THE PREFERRED EMBODIMENT

As required, a detailed embodiment of the present invention is disclosed herein. However, it is to be understood that the disclosed embodiment is merely exemplary of the present invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Referring now generally to the drawings and specifically to FIGS. 1 and 2 thereof, an exemplary apparatus constructed in accordance with the teachings of the preferred embodiment of the present invention is illustrated and identified with reference number 10. The apparatus 10 is specifically intended for supporting a container 12. FIG. 1 illustrates the apparatus 10 in perspective view in operative association with an exemplary container 12, such as a juice bottle or the like.

One intended application for the apparatus 10 of the present invention is for installation into a pre-formed aperture 14 in a motor vehicle interior console 16. However, it will be appreciated by those skilled in the art that the teachings of the present invention are widely applicable to additional applications where it is desirable to releasably secure a container 12. For example, the apparatus 10 of the present invention may be alternatively designed for deployment from the instrument panel, arm rest or other structure of the vehicle interior.

The apparatus 10 of the present invention is shown to include a two-stage frame 17 having a cuptray member 18 and a carrier member 20. The apparatus also generally includes a biasing mechanism 22 interconnecting the cuptray member 18 and the carrier member 20. Much of the focus of the present invention is directed to the construction and functional advantages of the biasing mechanism 22. It will become apparent below that the particular cuptray member 18 and carrier member 20 illustrated throughout the drawings are merely exemplary. However, an understanding of the cuptray member 18 and carrier member 20, which are largely conventional in construction, is warranted prior to addressing the biasing mechanism 22.

The carrier member 20 is illustrated as having a generally U-shape with a pair of upwardly extending segments 23. The upwardly extending segments 23 are interconnected by a lower segment 24. The lower segment 24 includes an upper surface 26. As will become apparent below, the upper surface 26 serves as a base for supporting the bottom of the beverage container 12.

The carrier member 20 is moveable between a first position (shown in FIG. 3A) substantially concealed within the console 16 of the vehicle interior and a second position (shown, for example, in FIG. 1) extending from the console 16. Between the first and second positions, the carrier member 20 translates within a first plane defined by the carrier member 20. The direction of translation is identified in FIGS. 3B and 3C with arrow A. In the embodiment illustrated, the plane defined by the carrier member 20 is substantially vertically oriented.

While not specifically illustrated, it will be understood to those skilled in the art, that the carrier member 20 is retained within the first plane by a guide member (not shown) of substantially conventional construction which is located within the console 16 of the vehicle interior. The guide member and the carrier member 20 cooperate to retain the carrier member 20 in the second position (as shown in FIG. 3C) unless a sufficient downward force is manually applied to the carrier member 20.

The cuptray member 18 includes a pair of opposing sides 30 and 32 interconnected by a pair of arcuate segments 34 and 36. The pair of opposing sides 30 and 32 and pair of arcuate segments 34 and 36 cooperate to define a generally circular central opening 38. The central opening 38 is adapted to receive the generally cylindrical beverage container 12.

The cuptray member 18 is telescopically received by the carrier member 20 for movement within the first plane between a telescopically retracted position and a telescopically extended position. The telescopically retracted position is shown, for example, in FIG. 2, while the telescopically extended position is shown, for example, in FIG. 3D. More specifically, the pair of opposing sides 30 and 32 are telescopically received in channels 42 (shown in phantom in FIG. 2) which are formed in the upwardly extending segments 23 of the carrier member 20.

The direction of travel of the cuptray member 18 between its telescopically retracted position and telescopically extended position is identified in FIG. 3D as arrow B. Upward movement of the cuptray member 18 in the direction of arrow B is limited by a pair of pins 44. The pin 44 associated with the side 30 of the cuptray member 18 is shown in FIG. 3E in hidden lines. The pins 44 outwardly extend from each of the pair of opposing sides 30 and 32 and engage a slot (not shown) in the carrier member 20.

When the cuptray member 18 is moved fully to its telescopically extended position, the pair of pins 44 cooperate to define a pivot axis within the plane defined by the carrier member 20. The cuptray member 18 may rotate about the pivot axis from substantially within the first plane to a second plane. In the exemplary embodiment illustrated, the second plane is substantially horizontal, and thereby substantially perpendicular to the plane defined by the carrier member 20. The direction of rotation of the cuptray member 18 relative to the carrier member 20 is identified in FIG. 3E with arrow C.

In the exemplary embodiment illustrated, the biasing mechanism 22 is illustrated to comprise an elastic band or strap having opposing ends 46 attached to the pair of upwardly extending segments 23. Alternatively, the biasing member 22 may comprise a spring or other element. A central portion 48 of the elastic band 22 is attached to one of the arcuate segments 36 of the cuptray member 18. The elastic band 22 functions to accomplish the following two purposes:

1. bias the cuptray member 18 when the frame 17 is deployed to horizontal position; and
2. bias the cuptray member 18 to telescopically retract relative to the carrier member 20 as the frame is moved towards its stowed position (as shown in FIG. 3A).

When the frame 17 is in its deployed position (as shown in FIG. 1), the elastic band 22 is under tension and thereby biases the cuptray member 18 downwardly. As a result, unintended movement between the cuptray member 18 and carrier member 20 (e.g. rattle) which occurs as a result of movement of the vehicle is minimized. In addition, depending on the circumferential dimension of the beverage container 12, the beverage container 12 may be captured between the elastic band 22 and further stabilized thereby.

During stowing, when the cuptray member 18 is rotated from its operative position in a horizontal plane to lie substantially within the vertical plane defined by the carrier member 20, the elastic band 22 functions to bias the cuptray member 18 to its telescopically retracted position relative to the carrier member 20. Conversely, a biasing force is imparted by the elastic strap 22 which opposes motion of the cuptray member 18 from its telescopically retracted position to its telescopically extended position. As a result, the effort necessary to fully deploy the frame 17 is regulated.

While it will be apparent to those skilled in the art that the preferred embodiment is well calculated to fulfill the above-stated objects, it will be also appreciated that the present invention is susceptible to modification, variation and alteration without departing from the scope and spirit of the claims as set forth below.

What is claimed is:

1. An apparatus for supporting a container deployable from a structure of a vehicle interior, the apparatus comprising:
    a two-stage frame moveable between a stowed position and a deployed position, said two-stage frame including:
        a first component translatable between a first position substantially within the structure of the vehicle interior and a second position extending from the structure of the vehicle interior; and
        a second component telescopically received by said first component such that said second component is moveable relative to said first component between a telescopically extended position and a telescopically retracted position, wherein said second component extends outwardly of said first component in said telescopically extended position and is positioned substantially within said first component in said telescopically retracted position; and
    a biasing mechanism interconnecting said first component and said second component, said biasing mechanism operative to bias said second component to said telescopically retracted position as said two-stage frame is moved from said deployed position to said stored position.

2. The apparatus for supporting a container of claim 1, wherein said biasing mechanism is an elastic strap.

3. An apparatus for supporting a container deployable from a structure of a vehicle interior, the apparatus comprising:
    a two-stage frame moveable between a stowed position and a deployed position, said two-stage frame including:
        a carrier member translatable in a first plane between a first position substantially within the structure of the vehicle interior and a second position extending from the structure of the vehicle interior; and
        a cup tray member telescopically received by said carrier member such that said cup tray member is movable relative to said carrier member between a telescopically extended position and a telescopically retracted position, wherein said cup tray member extends outwardly of said carrier member in said telescopically extended position and is positioned substantially within said carrier member in said telescopically retracted position, said cup tray member further interconnected to said carrier member for pivotal movement about an axis between said first plane and a second plane;
    a biasing mechanism interconnecting said carrier member and said cuptray member, said biasing mechanism operative for biasing said cuptray member to said second plane.

4. The apparatus for supporting a container of claim 3, wherein said biasing mechanism is an elastic strap.

5. The apparatus for supporting a container of claim 4, wherein said second plane is substantially perpendicular to said first plane.

6. The apparatus for supporting a container of claim 4, wherein said axis lies in said first plane.

7. An apparatus for supporting a container deployable from a console of a vehicle interior, the apparatus comprising:
    a two-stage frame including a carrier member extending in a first plane and a cup tray member telescopically received by said carrier member, said two-stage frame adapted to be moveable between a stowed position substantially within the console of the vehicle interior and a deployed position adapted to extend from the console of the vehicle interior, such that, between said deployed position and said stowed position said cup tray member pivots about an axis from the first plane to a second plane, said cup tray member telescopically retracts within said carrier member and said carrier member translates within said first plane; and
    a biasing mechanism interconnecting said carrier member and said cup tray member, said biasing mechanism biasing said cup tray member to said second plane when said two-stage frame is deployed and biases said cup tray member to telescopically retract relative to said carrier member in said first plane as said frame is moved towards said stowed position.

8. The apparatus for supporting a container of claim 7, wherein said pivot axis lies in said first plane.

9. The apparatus for supporting a container of claim 7, wherein said biasing mechanism is an elastic strap.

10. The apparatus for supporting a container of claim 7, wherein said second plane is substantially perpendicular to said first plane.

* * * * *